United States Patent
Stein et al.

(10) Patent No.: US 8,220,267 B1
(45) Date of Patent: Jul. 17, 2012

(54) PROCESS TO DETECT TWO-PHASE FLOW IN A CONDUIT

(75) Inventors: Elizabeth V Stein, Jupiter, FL (US); Alex Pinera, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 325 days.

(21) Appl. No.: 12/571,579

(22) Filed: Oct. 1, 2009

(51) Int. Cl.
*F02C 7/24* (2006.01)

(52) U.S. Cl. ............................... 60/725; 60/246

(58) Field of Classification Search ............ 60/257–260, 60/725, 200.1, 246; 431/114; 181/213
See application file for complete search history.

(56) References Cited

U.S. PATENT DOCUMENTS

| | | | |
|---|---|---|---|
| 3,403,509 A * | 10/1968 | Eastman et al. ............ | 60/39.281 |
| 3,844,304 A * | 10/1974 | Boothe ............................... | 137/7 |
| 5,119,427 A * | 6/1992 | Hersh et al. ................. | 381/71.14 |
| 5,251,482 A * | 10/1993 | Bates et al. .................... | 73/290 V |
| 5,445,517 A * | 8/1995 | Kondou et al. ................... | 431/18 |
| 5,880,377 A * | 3/1999 | Celik .......................... | 73/861.22 |
| 6,201,872 B1 * | 3/2001 | Hersh et al. .................... | 381/71.5 |
| 6,758,304 B1 * | 7/2004 | McLean ......................... | 181/206 |
| 6,912,918 B1 * | 7/2005 | Lynnworth et al. ......... | 73/861.26 |
| 7,322,195 B2 * | 1/2008 | Borja et al. ...................... | 60/725 |
| 7,942,066 B1 * | 5/2011 | Stein .......................... | 73/861.04 |
| 2003/0091198 A1 * | 5/2003 | Vanderveen ................. | 381/71.4 |

* cited by examiner

*Primary Examiner* — Phutthiwat Wongwian
(74) *Attorney, Agent, or Firm* — John Ryznic

(57) ABSTRACT

A Helmholtz resonator is used to detect a presence of a two-phase flow in a conduit. The resonator is sized so that a range of frequencies it is tuned for corresponds to a change in the speed of sound as the fluid changes from all liquid, to liquid plus vapor, and to all vapor. A band-pass filter is used to cancel out any external noise that would pollute the signal from the resonator. The resonator is used to monitor for a two-phase flow occurring within a feed line leading into a turbopump of a rocket engine.

3 Claims, 1 Drawing Sheet

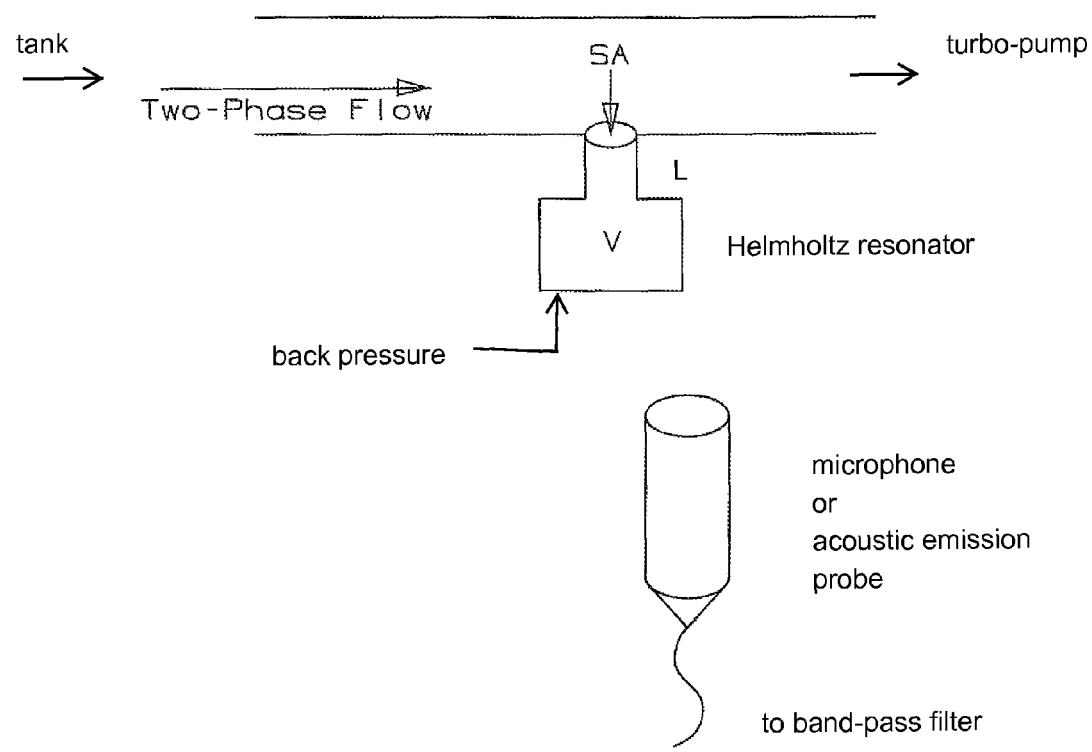

PROCESS TO DETECT TWO-PHASE FLOW IN A CONDUIT

GOVERNMENT LICENSE RIGHTS

None.

CROSS-REFERENCE TO RELATED APPLICATIONS

None.

BACKGROUND OF THE INVENTION

1. Field of the Invention

The present invention relates generally to a liquid fuel rocket engine, and more specifically to monitoring for two-phase flow in a rocket engine feed line.

2. Description of the Related Art Including Information Disclosed Under 37 CFR 1.97 and 1.98

A liquid fuel rocket engine burns a fuel with an oxidizer in a combustion chamber of a rocket nozzle to produce thrust. The fuel (such as liquid hydrogen) is stored in a fuel tank while the oxidizer (such as liquid oxygen) is stored in an oxidizer tank. Both tanks are typically pressurized to force the liquid from the tank into an entrance to a turbopump that then increases the pressure for delivery to the combustion chamber. The fuel is delivered into the fuel turbopump and the oxidizer is delivered into the oxidizer turbopump.

A turbopump operates best when the liquid being pumped does not change phase (into a vapor) because cavitation and instability problems will arise. The liquid hydrogen or liquid oxygen flowing through the feed line from the tank to the inlet of the turbopump can change phase from a liquid into a vapor due to a pressure drop, or too much flow velocity, or even due to local acceleration from the rocket turning. When two-phase flow, in which both liquid and vapor is present, enters the inducer of the turbo-pump, an unsteady flow condition could result. When a two-phase flow is detected in the feed line, corrective actions can be taken in the engine. However, it is difficult to detect and quantify the amount of two-phase flow, especially in cryogenic liquids when used under the varying conditions that a rocket engine is exposed to.

BRIEF SUMMARY OF THE INVENTION

It is an object of the present invention to provide for a turbopump of a rocket engine with steady flow entering an inducer of the turbopump.

It is an object of the present invention to provide for a turbopump of a rocket engine with a sensor to detect and quantify a two-phase flow in the feed line of the turbopump.

It is an object of the present invention to provide for a Helmholtz resonator with a band-pass filter that will cancel out external sounds that would pollute a signal from the resonator.

The above objective and more are achieved with the present invention that includes a Helmholtz resonator in a feed line of the turbo-pump with a microphone or an acoustic emission probe to detect for two-phase flow. The Helmholtz resonator is sized such that the range of frequencies it is tuned for corresponds to the change in the speed of sound as the flow changes from all liquid to all vapor. A change in frequency detected by the Helmholtz resonator is used to quantify the amount of two-phase flow, while the upper and lower frequency limits (corresponding to fully liquid and fully vapor flow) can be programmed into a band-pass filter so that no external noise from the launch vehicle will pollute the signal from the flow.

BRIEF DESCRIPTION OF THE SEVERAL VIEWS OF THE DRAWINGS

FIG. 1 shows a schematic view of a feed line with a Helmholtz resonator of the present invention.

DETAILED DESCRIPTION OF THE INVENTION

The Helmholtz resonator detector is used in a feed line to a turbopump in a rocket engine in order to detect for a two-phase flow. FIG. 1 shows a section of a feed line to carry a liquid from the tank to the turbopump. The feed line can be for the oxidizer or the fuel. Located in the feed line near to the inlet to the turbopump (most likely an inducer on the turbopump inlet) is the Helmholtz resonator. The Helmholtz resonator includes an inlet tube with an opening with a surface area (SA) that opens into the feed line and also opens into a cavity having a volume (V). The inlet tube has a length (L). A microphone or an acoustic emission probe is located near to the bottom side of the cavity to pick up a sound being emitted from the cavity. The microphone or probe is connected to a band-pass filter. The cavity is a closed cavity.

The flow of a liquid/vapor mixture through a pipe has a distinct sound compared to the flow of a pure liquid. A microphone or acoustic emission probe can be tuned to detect for a change in sound that occurs when two-phase flow begins. When monitoring for two-phase flow in a rocket engine feed line, the launch vehicle will be vibrating, distorting the signal. In such a situation, a Helmholtz resonator can act as an isolator of the two-phase flow signal. The Helmholtz resonator is sized such that the range of frequencies it is tuned for corresponds to the change in the speed of sound as the flow changes from all liquid to all vapor. The equation to size the Helmholtz resonator is:

$$f = \frac{c}{2\pi}\sqrt{\frac{SA}{V*L}}$$

Where f is the frequency of the resonator, c is the speed of sound of the fluid passing by the opening, (SA) is the surface area of the opening, L is the length from the inlet opening to the cavity of volume V.

The speed of sound of hydrogen, as it changes from a quality of 0 (liquid) to a quality of 1 (vapor) at a constant temperature (such as −420 degrees F.) decreases by almost 200%. Therefore, as the quality of the flow changes, so will the frequency, while the velocity in the feed line will remain constant. The change in frequency can be used to quantify the amount of two-phase flow, while the upper and lower frequency limits (corresponding to fully liquid and fully vapor flow) can be programmed into a band-pass filter, so no external noise from the launch vehicle pollutes the signal from the flow.

We claim the following:

1. A rocket engine comprising:
   a feed line connects a reservoir tank to a turbo-pump of the rocket engine to carry a fluid;
   a Helmholtz resonator having an inlet and a cavity connected to the feed line;
   a microphone or an acoustic emission probe located adjacent to the Helmholtz resonator to pick up a sound emanating from the cavity; and, the Helmholtz resonator is sized such that a range of frequencies is tuned for corresponds to a change in the speed of sound as a flow passing through the feed line changes from all liquid to liquid plus vapor and to all vapor.

2. The rocket engine of claim 1, and further comprising:
the liquid passing through the feed line is a cryogenic liquid.

3. The turbo-pump of claim 1, and further comprising:
a band-pass filter connected to the acoustic emission probe; and,
the band-pass filter is programmed so that no external noise from the rocket will pollute the signal Helmholtz resonator.

* * * * *